No. 650,277. Patented May 22, 1900.
J. ROSSNER.
DUPLEX FISH HOOK.
(Application filed Feb. 3, 1900.)
(No Model.)
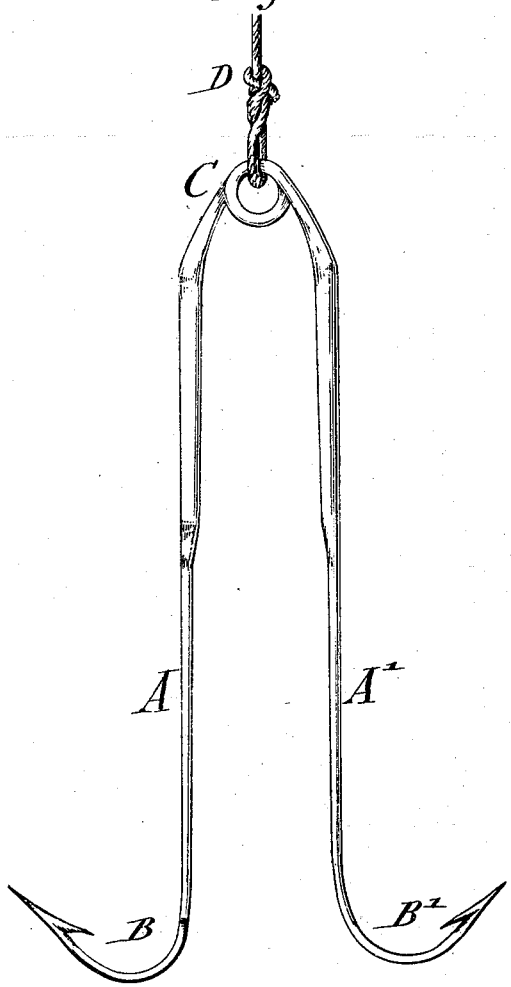
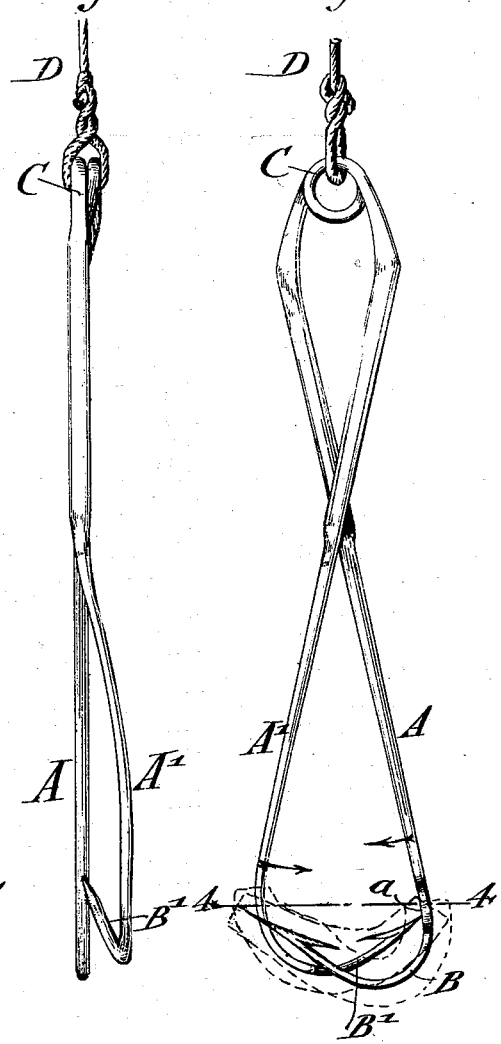
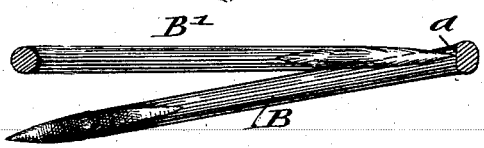
WITNESSES:
INVENTOR
John Rossner
BY
ATTORNEYS

UNITED STATES PATENT OFFICE.

JOHN ROSSNER, OF NEW YORK, N. Y.

DUPLEX FISH-HOOK.

SPECIFICATION forming part of Letters Patent No. 650,277, dated May 22, 1900.

Application filed February 3, 1900. Serial No. 3,869. (No model.)

*To all whom it may concern:*

Be it known that I, JOHN ROSSNER, a citizen of the United States, residing at New York, in the borough of Manhattan and State of New York, have invented certain new and useful Improvements in Duplex Fish-Hooks, of which the following is a specification.

This invention relates to duplex fish-hooks; and the object of the invention is to provide a duplex fish-hook arranged and set in such wise that as soon as the fish takes the bait the barbed hooks are dislocated and they spring apart, so as to increase the chances of catching the fish, thus making the sport of fishing more interesting and successful.

The invention consists, broadly, of a duplex fish-hook comprising two hook portions which point in opposite directions and the shanks of which are connected and made springy, so that the point of one hook portion may rest against the shank of the other hook portion and the barbed points be thereby set.

In the accompanying drawings, Figure 1 is a side elevation of my improved duplex fish-hook. Fig. 2 is a side elevation in a plane at right angles to Fig. 1. Fig. 3 is a side elevation showing the hooks set, the bait being in dotted lines; and Fig. 4 is a transverse section on line 4 4, Fig. 3.

Similar letters of reference indicate corresponding parts throughout the drawings.

Referring to the drawings, A A' indicate the shanks of my duplex fish-hook, and B B' the hook portions, pointed and barbed, as usual. The ends of the shanks A A' are joined by a spring-coil C, forming an eye for the attachment of the line D. The shanks A A' are arranged at or diverge from opposite sides of the spring-coil C, and the pointed ends of the hook portions are directed oppositely. One of the shanks—say A—is slightly flattened on its inner side at *a*, (see Fig. 4,) so that the point of the other hook portion may be set against it, as shown in Fig. 3, without danger of being too sensitive to disturbing forces.

In order to permit the described setting of the duplex fish-hook, it is necessary in the form of the invention shown that the outer end of shank A' be bent to one side of the plane of the device, as shown in Fig. 2, while the hook portion B' thereof is turned so as to form an acute angle with the plane of the hook portion B, whereby the point of the hook portion B' is brought approximately in the plane of the hook portion B and its shank. In this way the tension of the set parts at their point of contact is such that there is less liability to the fish-hook being sprung, as the strain is in the direction of the flat *a*.

To use my improved duplex hook, the hook portions are baited and then pressed together, so that both the shanks and the hook portions will cross, the point of the hook portion B' being set against the flat *a*. When a fish takes the bait, the hook portion B' is unseated and the two hook portions spring quickly apart, so that if the bait is not swallowed and the hooks do not penetrate at both sides of the mouth of the fish either one or the other hook is likely to enter the fish, depending upon which side the bait has been attacked. Even a nibbling of the bait is often sufficient to spring the duplex hook.

It is evident that the described duplex-hook may be made of one integral part or several parts brazed together.

Having thus described my invention, what I claim as new, and desire to secure by Letters Patent, is—

1. A duplex fish-hook, composed of two hook portions pointed in opposite directions, and two connected spring-shanks, one shank and its hook portion being approximately in one plane and the second shank being bent out of the plane of the first shank, its hook portion being bent at an acute angle to but toward the general plane of the device and having its point located in the general plane of the device and the spring tendency of the shanks retaining the said point in contact with the opposite shank, when the hook is set, substantially as set forth.

2. The duplex fish-hook, composed of two hook portions and two connected spring-shanks, the shank of one hook portion having a flat against which the point of the other hook portion may be set and toward which said point presses when the shanks are properly crossed, substantially as set forth.

In testimony that I claim the foregoing as my invention I have signed my name in presence of two subscribing witnesses.

JOHN ROSSNER.

Witnesses:
HUGO MÜLLER,
GEO. L. WHEELOCK.